US012246357B2

(12) United States Patent
Massé et al.

(10) Patent No.: US 12,246,357 B2
(45) Date of Patent: Mar. 11, 2025

(54) SYSTEM FOR SORTING MATERIALS WITH VACUUM APPARATUS

(71) Applicant: Industries Machinex, Plessisville (CA)

(72) Inventors: Marc Massé, Princeville (CA); Adrien Boucher, Plessisville (CA); Jean-François Bergeron, Quebec (CA)

(73) Assignee: INDUSTRIES MACHINEX INC., Plessisville (CA)

(*) Notice: Subject to any disclaimer, the term of this patent is extended or adjusted under 35 U.S.C. 154(b) by 0 days.

(21) Appl. No.: 17/605,277

(22) PCT Filed: Jul. 29, 2020

(86) PCT No.: PCT/CA2020/051036
§ 371 (c)(1),
(2) Date: Oct. 21, 2021

(87) PCT Pub. No.: WO2021/016707
PCT Pub. Date: Feb. 4, 2021

(65) Prior Publication Data

US 2022/0241823 A1 Aug. 4, 2022

Related U.S. Application Data

(60) Provisional application No. 62/879,880, filed on Jul. 29, 2019.

(51) Int. Cl.
*B07C 5/36* (2006.01)
*B07C 5/34* (2006.01)

(52) U.S. Cl.
CPC ............ *B07C 5/365* (2013.01); *B07C 5/3404* (2013.01); *B07C 2501/0063* (2013.01)

(58) Field of Classification Search
CPC ......... B07C 5/363; B07C 5/367; B07C 5/368; B07C 5/342; B25J 15/065; B25J 15/0658
See application file for complete search history.

(56) References Cited

U.S. PATENT DOCUMENTS 3,656,794 A 4/1972 McCord
5,040,353 A 8/1991 Evans et al.
(Continued)

FOREIGN PATENT DOCUMENTS

CN 202498042 10/2012
CN 107377413 11/2017
(Continued)

OTHER PUBLICATIONS

International Search Report, 7 pages, Alexis Cote, Oct. 23, 2020.
European Search report, Roland WICH, 6 pages, Apr. 19, 2022.

*Primary Examiner* — Patrick H Mackey
(74) *Attorney, Agent, or Firm* — Benoit & Cote Inc.; Charles-Andre Caron

(57) ABSTRACT

A system for sorting materials comprising a sorting apparatus comprising a handling tool and a robotized arm for displacing the handling tool over the materials; and a vacuum apparatus creating a depression and having a tubing extending from a source for the depression to the handling tool where the tubing for the vacuum apparatus ends and where it defines a diameter. The handling tool is adapted to be displaced to a selected item among the materials and perform a contact therewith with the end of the tubing for the vacuum apparatus for either: grabbing the selected item if the selected item is larger than the diameter; or sucking up the selected item if the selected item is smaller than the diameter, wherein sucking up the selected item has the selected item travel under the effect of the vacuum apparatus.

10 Claims, 6 Drawing Sheets

(56) References Cited

U.S. PATENT DOCUMENTS

| | | | | |
|---|---|---|---|---|
| 5,242,059 | A * | 9/1993 | Low | B07C 5/362 209/552 |
| 6,397,678 | B1 | 6/2002 | Popper | |
| 9,035,210 | B1 | 5/2015 | Davis | |
| 10,864,555 | B2 * | 12/2020 | McCoy, Jr. | B25J 15/0675 |
| 11,136,223 | B2 * | 10/2021 | Sato | B66C 1/0268 |
| 2006/0102450 | A1 | 5/2006 | Posner et al. | |
| 2019/0374978 | A1 * | 12/2019 | Borrell | B07C 5/367 |
| 2021/0061588 | A1 * | 3/2021 | Lukka | B65G 47/911 |

FOREIGN PATENT DOCUMENTS

| | | | |
|---|---|---|---|
| DE | 102015009998 | 2/2016 | |
| EP | 4265379 | 10/2023 | |
| JP | 2016124066 | 7/2016 | |
| WO | 9819799 | 5/1998 | |
| WO | 2012067512 | 5/2012 | |
| WO | WO-2019207201 A1 * | 10/2019 | B07C 5/00 |

* cited by examiner

SYSTEM FOR SORTING MATERIALS WITH VACUUM APPARATUS

CROSS-REFERENCE TO RELATED APPLICATIONS

This application claims the priority or benefit of U.S. provisional patent application 62/879,880, filed Jul. 29, 2019, the specification of which is hereby incorporated herein by reference in its entirety.

BACKGROUND

(A) Field

The subject matter disclosed generally relates to a sorting system for sorting materials, such as recyclable materials or construction materials. More specifically, it relates to a sorting system comprising a vacuum apparatus for selective handling and vacuum cleaning of the materials.

(b) Related Prior Art

There are various systems designed for sorting materials, such as in the recycling industry. The sorting can be done in an automatic manner using optical means for recognizing particular types of objects on a conveyor, and using a handling tool to grab objects to be sorted.

Heterogeneity of the materials on the conveyor, both in terms of size and nature of the materials, makes the handling a difficult task. Performing this task further involves temporary stocking of such heterogenous materials, which is hard to manage in the industrial workflow. Improvements in the sorting systems need to address these issues.

SUMMARY

According to an aspect, there is provided a system for sorting materials comprising:

- a sorting apparatus comprising a handling tool and a robotized arm for displacing the handling tool over the materials; and
- a vacuum apparatus creating a depression and having a tubing extending from a source for the depression to the handling tool where the tubing for the vacuum apparatus ends and where it defines a diameter;
- wherein the handling tool is adapted to be displaced to a selected item among the materials and perform a contact therewith with the end of the tubing for the vacuum apparatus for, at least one of:
- grabbing the selected item if the selected item is larger than the diameter; and
- sucking up the selected item if the selected item is smaller than the diameter, wherein sucking up the selected item has the selected item travel through the tubing under the effect of the vacuum apparatus.

According to an embodiment, the system further comprises a decanter downstream of the source for the depression for receiving the selected item having travelled through the tubing.

According to an embodiment, the system further comprises a purge system operatively connected to the vacuum apparatus.

According to an embodiment, the purge system comprises an injection point for compressed air in the tubing between the decanter and the source for the depression for temporarily reducing vacuum to stop the materials being sucked up.

According to an embodiment, the purge system comprises a valve to shunt tubing by the injection point to further reduce vacuum to stop the materials being sucked up.

According to an embodiment, the purge system comprises a trap door at a bottom of the decanter which is operable to open simultaneously with an operation of the injection point for compressed air to purge the decanter while no materials fall into the decanter.

According to an embodiment, the tubing extending from a source for the depression to the handling tool comprises a plurality of ends each extending from a corresponding source for the depression being independent for each end, and ending at a same handling tool.

According to an embodiment, the system further comprises a conveyor under the handling tool for moving the materials to be sorted, According to an embodiment, the tubing extending from a source for the depression to the handling tool comprises a tube end which performs the contact with the selected item, the tube end comprising a flexible portion for longitudinal contraction.

According to an embodiment, said flexible portion is a bellow, and the vacuum apparatus creating a depression and the bellow of the tube end are adapted to have the bellow contract sufficiently when the tube end performs the contact with the selected item to lift the selected item of a height at least as high as a height of the selected item for lifting above the conveyor.

According to an embodiment, the system further comprises another injection point for compressed air close to where the tubing for the vacuum apparatus ends for temporarily reducing vacuum to stop the materials being sucked up and to unclog said portion of the tubing.

According to another aspect, there is provided a method for sorting materials comprising:

- conveying materials among which an item is to be sorted;
- selecting the item for removal from the conveyed materials;
- displacing a handling tool onto the item;
- performing a vacuum at a vacuum tube end within the handling tool, thereby grabbing said item by suction if the item is larger than the vacuum tube end or sucking up the item through the vacuum tube end if the item is smaller than the vacuum tube end.

According to an embodiment, the method further comprises providing a vacuum source and a decanter upstream of the vacuum source.

According to an embodiment, the method further comprises purging the item sucked up through the vacuum tube.

According to an embodiment, purging comprises injecting compressed air in tubing between the decanter and the vacuum source for temporarily reducing the vacuum to stop the materials being sucked up.

According to an embodiment, the step of injecting compressed air in tubing between the decanter and the vacuum source for temporarily reducing the vacuum to purge the decanter also performs a pressure cleaning of a filter located by the decanter in direction of the vacuum source.

According to an embodiment, purging comprises shunting the tubing by the injection point to further reduce vacuum to stop the materials being sucked up.

According to an embodiment, when grabbing said item by suction, a vacuum is continuously applied and wherein the step of grabbing comprises grabbing with a flexible bellow, such that when the vacuum is continuously applied, the bellow contracts longitudinally to lift the item above the conveyor.

According to an embodiment, the method further comprises injecting compressed air at another injection close to the vacuum tube end for temporarily reducing vacuum to stop the materials being sucked up and to unclog said portion of the tubing.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
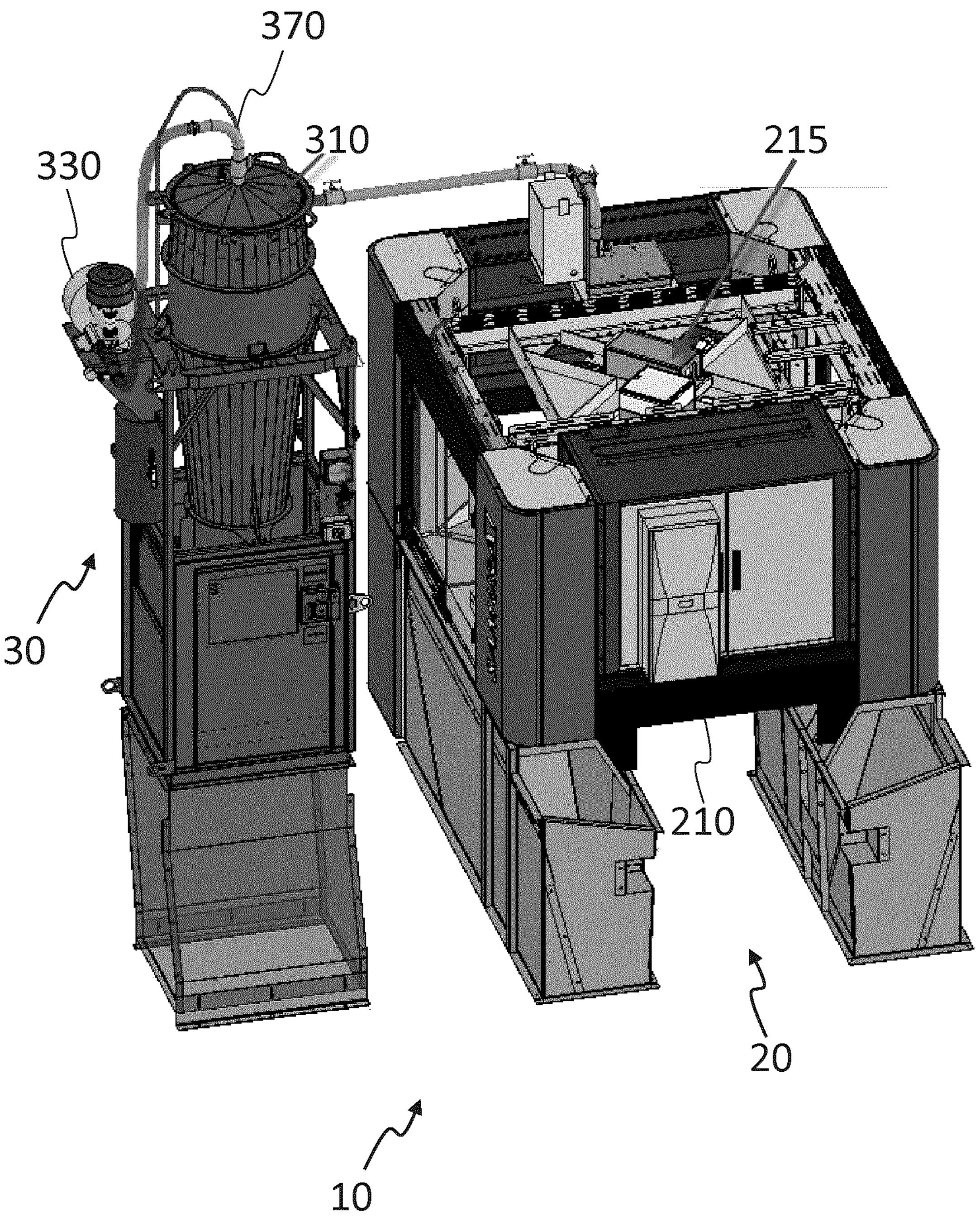
FIG. 1 is a perspective view illustrating an apparatus for sorting materials, according to an embodiment of the invention.

Referring to FIG. 1, there is shown a system 10 for sorting materials undergoing a movement, such as on a running conveyor. The system 10 according to an embodiment of the invention comprises a sorting apparatus 20 and a vacuum apparatus 30 in combination therewith. The sorting apparatus 20 comprises a conveyor 210 on which the materials (comprising individual items to be sorted) are transported, or any other mechanism by which the materials to be sorted are being moved for the purpose of performing selective picking during said movement, the movement permitting a high frequency for this selective picking. The sorting apparatus 20 is adapted to perform real-time identification of the items transported thereon in view of the selective picking.

A handling tool 220, or head, is provided and is used to grab and handle selected large items on the conveyor 210, or alternatively to suck up selected small items away from the conveyor 210, depending on a real-time identification made immediately before the grabbing or the sucking action. The handling tool 220 is robotized, so that the handling tool 220 is directed right above the expected location of the selected items on the moving conveyor 210 (or any other moving mechanism), and the handling tool 220 can grab the item for removal from the conveyor 210 and displacement to another location (e.g., into a dedicated container, onto another conveyor, onto a specific location on the floor, etc.).

Figure 2:
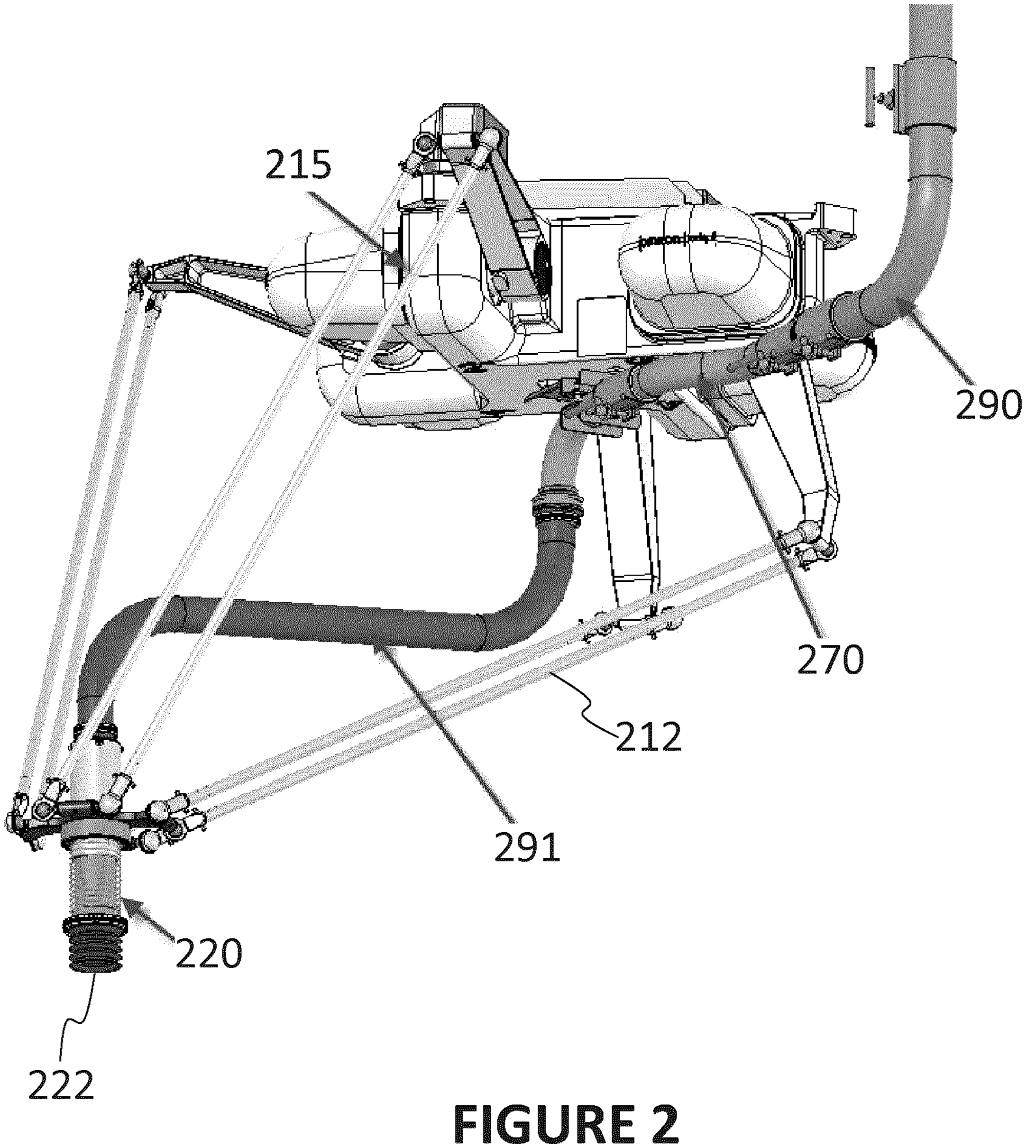
FIG. 2 is a perspective view illustrating a sorting device in the apparatus for sorting materials, according to an embodiment of the invention.

The sorting apparatus 20 comprises a mechanism to displace the handling tool 220 by robotized translation of the handling tool 220 over the conveyor 210, for example arms 212, which are shown in FIG. 2. These arms 212 are expected to extend from a gantry or another static location above the conveyor, and are robotized be able to translate the handling tool 220 at the location where the items to be grabbed or sucked up are to be located at the end of the movement of the handling tool 220 (i.e., the time taken for the robotized translation and the movement of the item over the conveyor 210 during this time interval should be taken into account when the robotized movement is instructed). Items are identified using appropriate optical equipment 214, which can comprise cameras using image recognition, or other tools involving spectrometry (i.e., with a light source where the reflected light is analyzed) and the like to identify the nature of the items to grab or suck up, in particular the nature of the object (to decide whether to act on it or not) and the position where the handling tool 220 should be displaced to act on it. The result is that a given item to remove will be either grabbed or sucked up, depending on its size relative to the diameter of the tubing, or not acted upon depending on the nature of the item, as described further below.

The device which controls the arms 212 and which receives data from the optical equipment 214 is generically called the sorting robot 215, which can comprise a controller 300 for the system 10, or be operatively connected to such a controller 300, which receives and treats data to perform the tasks in the system 10.

According to an embodiment of the invention, the handling tool 220 comprises a vacuum tube end 222. Such a vacuum tube end 222 for the handling tool 220 is advantageous to provide a double functionality of either grabbing large items by suction, thereby acting like a suction cup, or sucking up small items away to perform vacuum cleaning. To this end, there is provided a vacuum tubing 290, which extends from the handling tool 220, where it has its vacuum entry point, to a decanter 310, where it has its exit point. The vacuum tubing 290 performs the vacuum cleaning by removal of small items through the tubing, captured by the low pressure which draw them away and moves them through the vacuum tubing 290 toward the source of vacuum, and also performs the static suction by providing a tubing where a vacuum is made when the end (vacuum entry point) is obstructed by the large item to be sucked the large item being statically held there by suction.

In that particular case, the handling tool 220 is well adapted to vacuum clean (i.e., remove) the small items among the materials on the conveyor 210. The implication is that small items can be identified, so that the handling tool 220 is directed (i.e., instructed and moved by the controller) right above the expected location of these items on the moving conveyor 210 (i.e., expected location by the end of the movement of the handling tool 220), and the vacuum will suck up the small items away from the conveyor 210, using the vacuum tubing 290, to remove such small items from the conveyor 210. The assumption here is that small items usually need to be removed as they are either valuable materials that need to be collected, undesirable debris that need to be removed, or materials that need to be put in a single place for any other reason, whether the materials being sorted are for recycling, construction, or other industrial processes. The expression "small items" may also refer to items which are not necessarily small, but are flexible or deformable such as to be suckable by the tubing. An example of such deformable or flexible items that fit inside the diameter of the tubing 290 can include consumer plastic bags.

Figure 5:
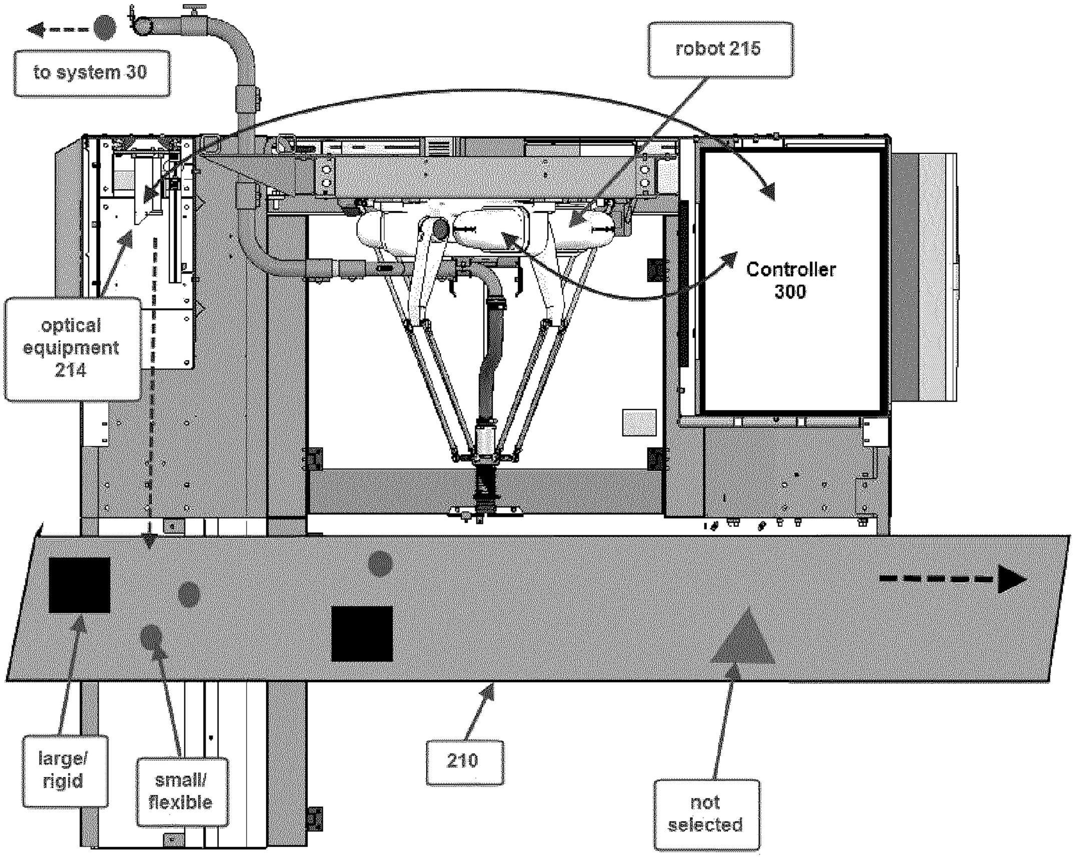
FIG. 5 is a schematic diagram illustrating the system for sorting materials, according to an embodiment of the invention.

FIG. 5 illustrates the materials on the conveyor 210, including small and large items with a differentiated treatment (i.e., selective sorting).

Figure 3:
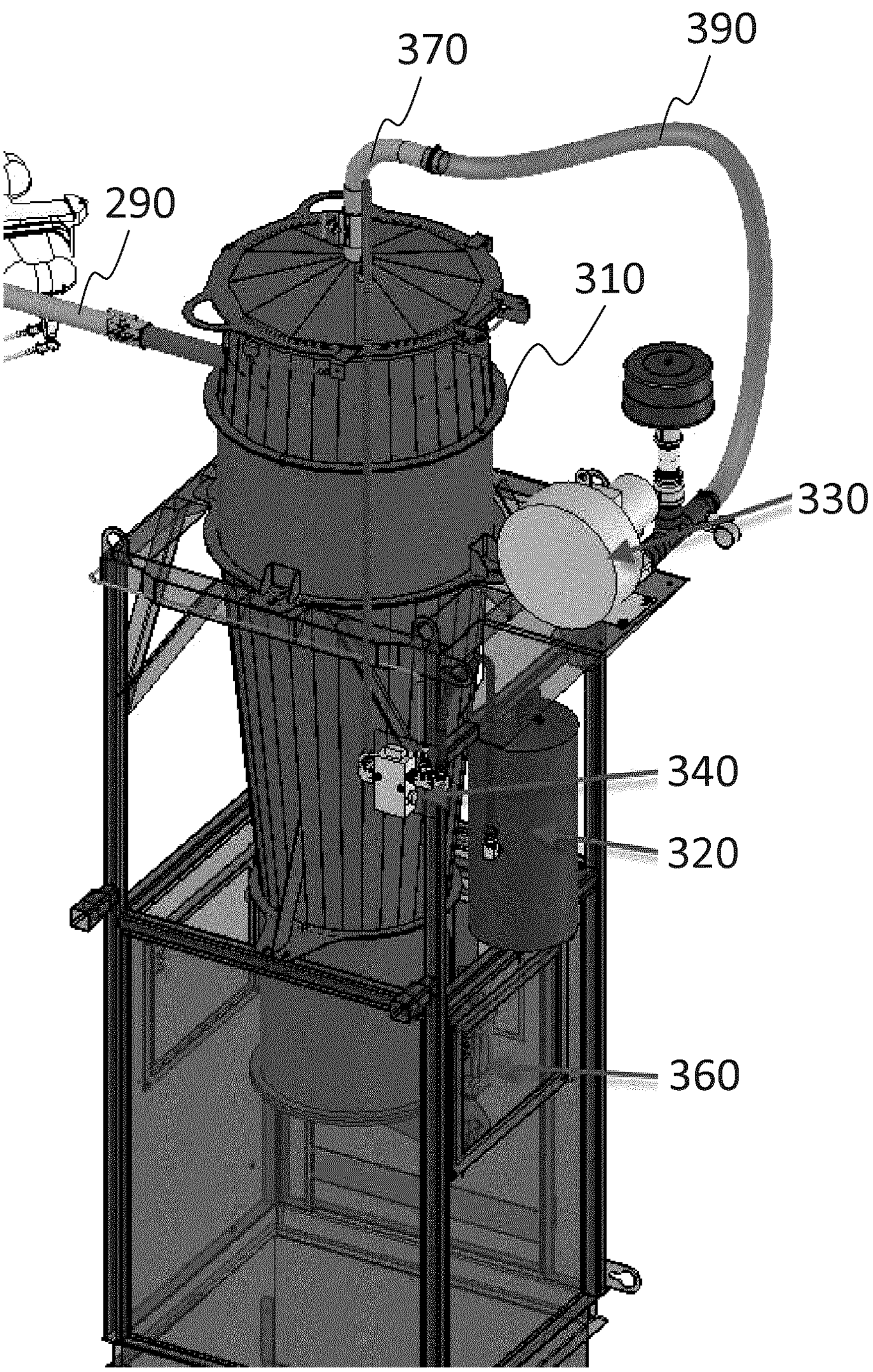
FIG. 3 is a perspective view illustrating a cyclonic decanter for the apparatus for sorting materials, according to an embodiment of the invention.

According to an embodiment, and as shown in FIG. 1 and, more clearly, in FIG. 3, the decanter 310 is a cyclonic decanter, which uses a rotary movement of the volume of air containing particles in suspension therein to filter said particles (i.e., the small items) from said volume of air by having them fall down into the container of the decanter 310, while leaving the cleaned volume of air flow upwardly. The decanter 310, when embodied as a cyclonic decanter, is typically a single container with an upper portion shaped as a cone in which the entering air flows in a tangential direction along the conical surface to separate particles (which fall down) and air (which flows up). After a continuous use of the system 10, it should be expected that the decanter 310 fills up with the small items or particles accumulating therein.

Considering that the vacuum tube end 222 is upstream, there is defined another location downstream of the decanter 310, a vacuum fan motor 330 (at the most downstream location in the path) that creates the necessary depression (pressure gradient) between itself and the decanter. Tubing 390, extending between the decanter 310 and the vacuum fan motor 330, connects them to perform the vacuum function by significantly decreasing the pressure in the decanter 310 and by keeping it low during operation. It should however be noted that the vacuum fan motor 330 that creates the necessary depression can be located elsewhere in the system 10, for example within the tubing 290 (therefore, upstream of the decanter 310 or of any other item depository), as long as the sucked items can keep moving into the tubing 290, for example using their momentum to keep moving past the vacuum fan motor 330 toward the decanter 310, or fall within the tubing 290 under the force of gravity for example.

In order to achieve the double function of grabbing large items by static suction at the tube end and sucking up small items through the lumen of the tubing for vacuum cleaning, the depression created by the vacuum fan motor 330 (acting as a source of depression for the vacuum function) should be in the order of 40 inches of water or above, such as between 40 and 80 inches of water, preferably between 50 and 80 inches of water, and more preferably about 70 inches of water. An inch of water is the typical unit measurement in this field and it is equivalent to 248.84 Pa.

The vacuum tube end 222 is expected to be the end of a tube and therefore is expected to have a substantially circular opening. The diameter of this circular opening should be chosen to fit the desired threshold which defines which items are being grabbed and which items are being sucked up, and therefore depends on the application. Such a diameter can range between 0.5" to 8", for example about 2". Items larger than this diameter or threshold are expected to be grabbed, while those smaller are expected to be sucked up through the tubing 290, downstream toward the decanter 310.

After a significant period of time of operating the system 10, the decanter 310 will slowly fill up and the system 10 will become less efficient. In a typical work flow, the system 10 would need to be stopped completely to empty the decanter and clean it. This is a normal maintenance task, but it implies stopping the apparatus, which is not efficient.

According to an embodiment of the invention, there is provided a cleaning tool and method of operation thereof which allows emptying and purging the decanter 310 and avoiding turning the system 10 off. A compressed air source 320 is provided. The compressed air source 320 connects to a compressed air injection point 370 in the vacuum tubing 390.

According to an embodiment of the invention, the compressed air injection point 370 is located between the vacuum fan motor 330 and the decanter 310. The injection point 370 can otherwise be located at other places in the system 10 as long as the result is a significant decrease in the depression that is measured at the vacuum tube end 222.

According to another exemplary embodiment, the injection point 370 can be replaced by a valve that shuts the tubing to effectively cease the depression from reaching the vacuum tube end 222.

A valve 340 is located between the compressed air source 320 and the compressed air injection point 370 to act as a logical gate which lets compressed air into the tubing 390 to perform the purge. The valve is controlled by a controller 300, such as the computer controlling the system 10, which instructs the valve 340 to open when the purge is to be performed.

This purge can be performed periodically according to some rules. For example, it can be performed after a definite period of time operating the system 10, or after a given number of items sucked up through the handling tool 220, or after a given volume of material that was sucked up, or after a given height of small items in the decanter 310, using in each case the appropriate detector.

The injection of compressed air has the effect of counterbalancing the vacuum from the vacuum fan motor 330 to reduce significantly or cancel the pressure gradient between the decanter 310 and the vacuum tube end 222. Injected compressed air flows toward the vacuum fan motor 330 that created the depression and thereby stops the air flow from flowing toward the decanter 310. The overall effect in the tubing 290 is to stop the vacuum at the level of the handling tool 220 and to stop inflow of materials into the decanter 310.

Once the injection has started, the controller 300 can instruct the opening of a trap door 360 below the decanter 310, or any other suitable means for emptying the decanter 310 by timing this operation with the injection of compressed air (i.e., the opening of the trap is simultaneous with the injection of compressed air which momentarily stops the vacuum mode of operation of the apparatus). This can be performed in a few seconds, for example by maintaining the injection of compressed air in the tubing for a given period of time between 2 and 4 seconds. During this time, the injection of compressed air in the tubing under vacuum operation reduces the pressure gradient, below a threshold where small items cannot be sucked up anymore, and thereby stops the flow of air and small items into the decanter 310. The injection and its effect is almost instantaneous and this is why the purge can be performed so fast and easily without having to stop and restart the vacuum fan motor 330, which would take longer to do. Once this is done, the trap is closed again and the purged decanted is ready for operation again. The controller 300 can therefore instructs the valve 340 to close to stop injection of compressed air and restart the normal vacuum mode of the handling tool 220.

Moreover, this injection of compressed air can advantageously clean the filter at the exit of the tubing/entry of the decanter 310 because the injected compressed air is directed toward the entry of the decanter 310, that it reaches with high pressure and velocity against the normal flow direction (being normally from the decanter 310 to the vacuum fan motor 330 while the compressed air being injected within the same tubing travels to the decanter 310) and can perform a mechanical action of cleaning the filter by flowing therethrough in the reverse direction.

In order to actuate the opening of the trap door 360, there may be provided a pneumatic cylinder, a hydraulic cylinder, or any other type of servomotor which can actuate a hinge or a similar device that opens a door, as instructed by the controller in synchronicity with the injection of compressed air.

This process ensures that the purge of the decanter 310 is performed in about 3 seconds. This procedure is almost seamless and does not hamper the operation of the system 10.

According to another embodiment, the decanter 310 can be replaced by a chopper-blower to separate the small items, or flexible items (e.g., plastic bags) from the air that has been drawn thereinto.

According to another embodiment, the decanter 310 can be replaced by, or comprise therein, a screw compactor to separate the small items, or flexible items from the air that has been drawn thereinto, or to compact or withdraw materials. An endless screw compactor inside the decanter 310 would therefore act as a purge system therefor, and can be operated continuously to provide a continuous purge.

According to another embodiment, the decanter 310 can have no bottom (i.e., no cyclonic decanter in the system 10) such that the sucked up small items fall onto the floor at a dedicated location. This alternative embodiment removes the requirement of a trap and of the injection of compressed air. In that case, it is likely that the vacuum fan motor 330 that creates the necessary depression will be located upstream of that dedicated location. In this case, as already mentioned above, the sucked items should keep moving into the tubing 290, for example using their momentum to keep moving past the vacuum fan motor 330 toward their final destination, or fall within the remaining parts of the tubing 290 under the force of gravity for example. This case in which there is no decanter, and having the vacuum fan motor 330 upstream of the final destination of the sucked items, can be referred to as an automatic, continuous purge system. Advantageously, there is no constrained limit on the volume of those items that can be captured (i.e., as large as the facility can allow, but not constrained by a container size).

According to an embodiment, there is provided another injection point 270 closer to the handling tool 220, i.e., between the handling tool 220 and the decanter 310. This compressed air, when injected, has the effect of cancelling the depression directly at the level of the handling tool 220. This is useful to release a large item that was grabbed by the handling tool 220 using suction, the release being performed instantaneously as the compressed air is injected in tubing close to the handling tool.

As mentioned above with respect to the injection point 370, a valve or any other suitable mechanism that shuts the tubing to effectively cease the depression from reaching the vacuum tube end 222 can be added between the decanter 310 and the injection point 270, to reduce flow or, equivalently, pressure at the injection point 270.

Indeed, when a large item is grabbed by the handling tool 220, it is not sucked up away through the tubing 290 as described with respect to the small items. It is instead captured, under the effect of static suction provided by the pressure gradient, by the handling tool 220, which can lift up the item as long as the depression generated by the vacuum fan motor is sufficient for the weight of the large item (and taking into account that the shape of the object may not fit perfectly the vacuum tube end 222, as described below, in which case higher pressure gradients may be necessary to keep holding the large item). According to an embodiment, the tubing 290 comprises a flexible portion 291 which can adapt to the robotized movement of the handling tool 220. Moreover, when a large item is grabbed, a larger depression (i.e., pressure difference) is temporarily created within the tubing 290 as the vacuum fan motor 330 keeps running while there is no more air inflow from the vacuum tube end 222, and the handling tool 220 deforms and contracts on itself, which has the effect of naturally lifting the end of the handling tool 220 and the grabbed item altogether along with the deformation of the handling tool 220 as a consequent result of the pressure gradient buildup following the grabbing action. The handling tool 220 can therefore be provided advantageously with a resilient material forming a bellow, as shown in FIG. 2, or any other shape the deforms such as to be contracted longitudinally. This lift movement brings the grabbed item up, away from the other materials on the conveyor, the handling tool 220 can therefore be translated horizontally to bring the item elsewhere. To release the large item, injection of air in the injection point 270, for example immediately downstream of the flexible portion 291, cancels the depression, thereby eliminating the suction by which the item is grabbed and effectively releasing it under gravity. To avoid the whole tubing 290 to undergo deformations, the tubing 290 can be rigid, but for the flexible portion close to the handling tool 220, and the handling tool 220 should be deformable in longitudinal compression to undergo the contraction movement due to the pressure gradient buildup during grabbing. For a proper lift, the contraction of the bellow at the end of the tubing 290 should be at least as high as the height of the large objects on the conveyor for lateral displacement and release of the object being grabbed, The depression ranges described above are chosen to be sufficient to provide the necessary suction airflow to be able to grab items which have an irregular surface. For example, items with a large surface are grabbed by having the vacuum tube end 222 enter in contact with the surface and form a suction grabber. If the surface is irregular, the contact may not be good, and air may still pass through interstices between the vacuum tube end 222 and the item's surface. Having a large depression in the vacuum system 30 ensures that the item will still be grabbed despite the imperfect contact of the vacuum tube end 222 with its surface. Otherwise, providing the vacuum tube end 222 with a resilient material such as rubber or an equivalent thereof may help in providing an efficient suction cup effect for grabbing.

The injection of compressed air at the injection point 270 further provides a mean for unclogging the tubing, should there be any materials stuck therein, especially close to the handling tool 220, due to a misclassification of an item as being a small item where it should not have entered the tubing in the first place.

According to an embodiment, the injection points 270 or 370 comprise a specific internal shape of the tubing which ensures that the injection of compressed air is efficient to compensate for the depression and thereby cancel the vacuum. For example, the tube may be shaped as a sequence of two consecutive elbows (e.g., 45° elbows) in the tubing, creating an obstacle for the airflow in the tubing 290 or 390, with the point of injection 270 or 370 being a nozzle ending at the center of the lumen of the tube between these elbows. This geometry improves the effectiveness of vacuum cancelation, whether for the release of the grabbed item at the handling tool 220 or for purging the decanter 310.

According to an embodiment, the handling tool 220, or head, can comprise more than one vacuum tube end 222, for example two tube ends, one being for grabbing items and the other being for sucking items away. The tubing 290 can comprise a corresponding number of tubes, or the tube can split to form the more than one vacuum tube end 222. In other words, if the moving the head comprises more than one end, the plurality of ends can have their vacuum generated by the same blower (i.e., the same vacuum fan motor 330) or by a corresponding plurality of motors, or any combination. The pressure can be set to be the same in all ends of the head, or an be set at different pressures, which would imply a selective removal of small items and grabbing of large items depending on the size and weight, i.e., each tube end does not suck or grab the same things due to different pressures in their tubing (only a large depression can be used on heavier items). The controller 300 may then decide which tube end among the plurality is the most appropriate for a specific sucking or grabbing task to be performed. The robot 215 can move all the tube ends or, alternatively, different robots may be used for the plurality of tube ends.

Figure 4:
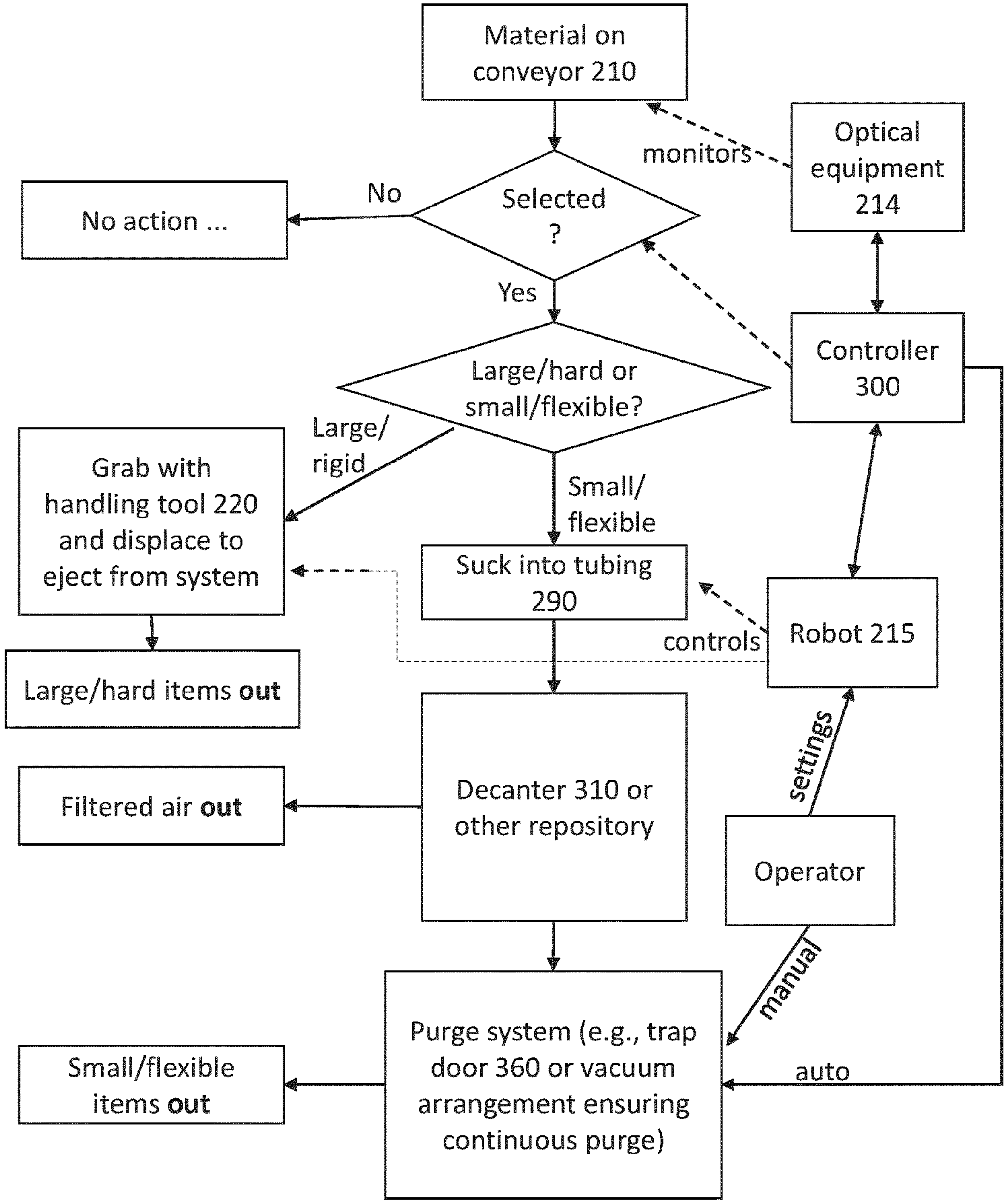
FIG. 4 is a flowchart illustrating the components of the system for sorting materials, according to an embodiment of the invention.

FIG. 4 illustrates that the material on the conveyor 210 are selected or not. Those not selected remain on the conveyor. Those which are selected by the optical equipment 214 are classified as a large or small (or hard or flexible), and are grabbed or sucked accordingly, these operations being controlled by the sorting robot 215. Sucking small or flexible items (or any other type which fits inside the tubing 290 or deforms to fit thereinto) results in them ending up in the decanter 310 or other free repository, and are purged. The purge can be operated manually by the operator, or automatically by the controller 300. The purge can involve opening the decanter 310 using a door, or can instead involve having the vacuum fan motor 330 located upstream of the repository of small items such that the vacuum operation on those small items also includes a continuous and automatic purge. The purge system can therefore comprise either the trap door 360 along with the injection point 370 and other associated equipment, or it can relate to the arrangement (vacuum motor fan upstream of the final destination of the small items) that makes possible the continuous purge, or to any other device described herein such as an endless screw or a chopper-blower, for example.

Figure 6:
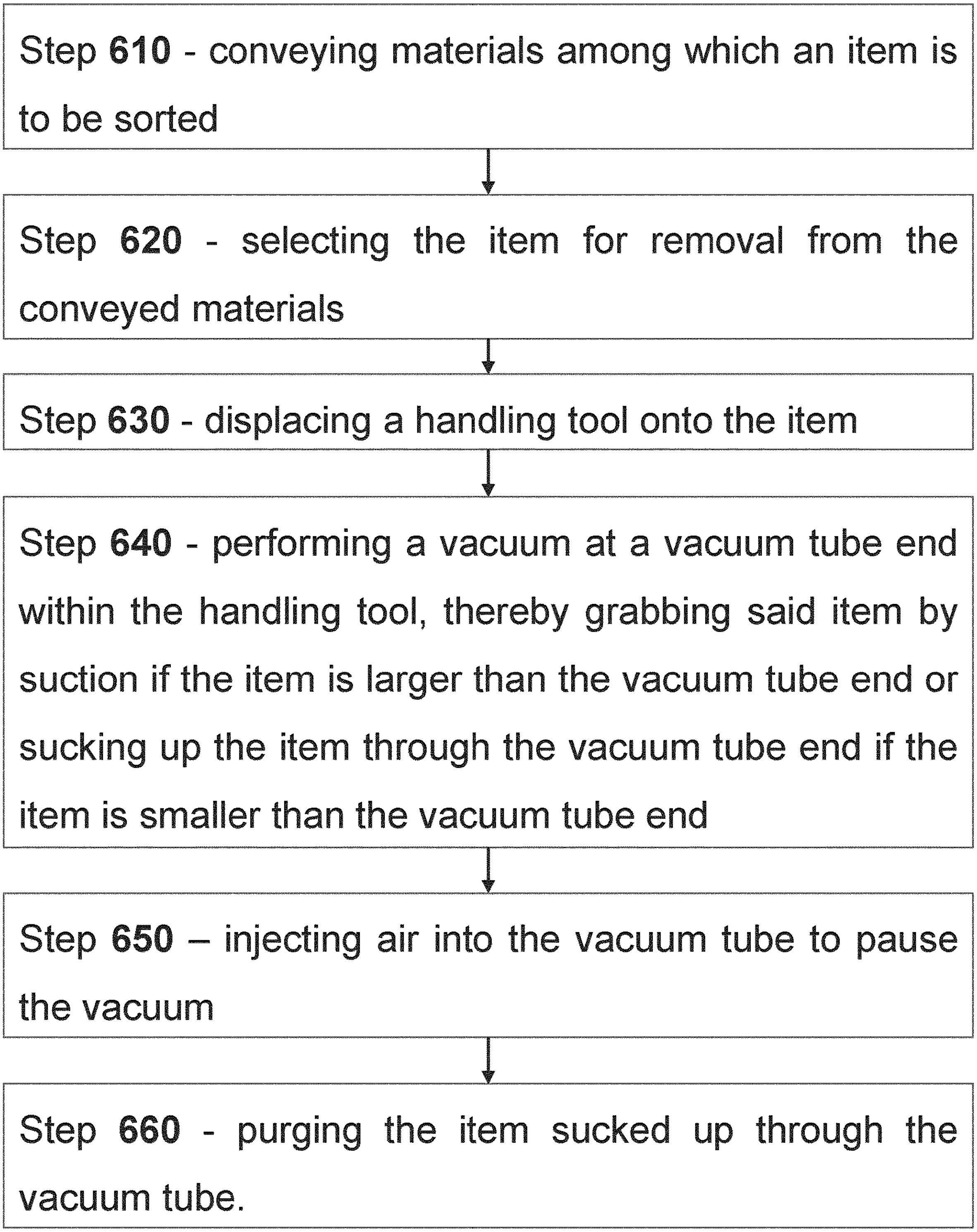
FIG. 6 is a flowchart illustrating a method for sorting materials, according to an embodiment of the invention.

FIG. 6 is a flowchart which summarizes the method for sorting materials and comprises the following steps.

Step 610—conveying materials among which an item is to be sorted;

Step 620—selecting the item for removal from the conveyed materials;

Step 630—displacing a handling tool onto the item;

Step 640—performing a vacuum at a vacuum tube end within the handling tool, thereby grabbing said item by suction if the item is larger than the vacuum tube end or sucking up the item through the vacuum tube end if the item is smaller than the vacuum tube end;

Step 650—injecting air into the vacuum tube to pause the vacuum; and

Step 660—purging the item sucked up through the vacuum tube.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for sorting materials comprising:

a sorting apparatus comprising a handling tool and a robotized arm for displacing the handling tool over the materials; and a vacuum apparatus creating a depression and having a tubing extending from a source for the depression to the handling tool where the tubing for the vacuum apparatus is flexible and ends and where it defines a diameter;

wherein the handling tool is adapted to be displaced to a selected item among the materials and perform a contact therewith with the end of the tubing for the vacuum apparatus for, at least one of:

grabbing the selected item if the selected item is larger than the diameter; and sucking up the selected item if the selected item is smaller than the diameter, wherein sucking up the selected item has the selected item travel through the tubing under the effect of the vacuum apparatus, wherein the handling tool deforms and contracts on itself as a consequent result of a pressure gradient buildup following the grabbing, to lift an end of the handling tool and the selected item being grabbed altogether at least as high as a height of the selected item for lifting above the conveyor, the system further comprising an item-receiving decanter, connected to the tubing downstream of the source for the depression, and a purge system operatively connected to the vacuum apparatus, the purge system comprising an injection point for compressed air in the tubing between the decanter and the source for the depression for temporarily reducing vacuum to stop the materials being sucked up, wherein the purge system comprises a trap door at a bottom of the decanter which is operable to open simultaneously with an operation of the injection point for compressed air to purge the decanter while no materials fall into the decanter.

2. The system of claim 1, wherein the purge system comprises a valve to shunt tubing by the injection point to further reduce vacuum to stop the materials being sucked up.

3. The system of claim 1, further comprising a conveyor under the handling tool for moving the materials to be sorted.

4. The system of claim 3, wherein the tubing extending from a source for the depression to the handling tool comprises a tube end which performs the contact with the selected item, the tube end comprising a flexible portion for longitudinal contraction.

5. The system of claim 3, wherein said flexible portion is a bellow, and the vacuum apparatus creating a depression and the bellow of the tube end are adapted to have the bellow contract sufficiently when the tube end performs the contact with the selected item to lift the selected item of a height.

6. The system of claim 1, further comprising another injection point for compressed air close to where the tubing for the vacuum apparatus ends for temporarily reducing vacuum to stop the materials being sucked up and to unclog said portion of the tubing.

7. A method for sorting materials comprising:

conveying materials among which an item is to be sorted;

selecting the item for removal from the conveyed materials;

displacing a handling tool onto the item;

performing a vacuum at a vacuum tube end within the handling tool, thereby grabbing said item by suction if the item is larger than the vacuum tube end or sucking up the item through the vacuum tube end if the item is smaller than the vacuum tube end, wherein the handling tool deforms and contracts on itself as a consequent result of a pressure gradient buildup following the grabbing, to lift an end of the handling tool and the selected item being grabbed altogether at least as high as a height of the selected item for lifting above the conveyor;

providing a vacuum source and a decanter upstream of the vacuum source; and injecting compressed air at an injection point in tubing between the decanter and the vacuum source for temporarily reducing the vacuum to stop the materials being sucked up, which also performs a pressure cleaning of a filter located by the decanter in direction of the vacuum source; and purging the item sucked up through the vacuum tube by injecting the compressed air at the injection point.

8. The method of claim 7, wherein purging comprises shunting the tubing by the injection point to further reduce vacuum to stop the materials being sucked up.

9. The method of claim 7, wherein when grabbing said item by suction, a vacuum is continuously applied and wherein the step of grabbing comprises grabbing with a flexible bellow, such that when the vacuum is continuously applied, the bellow contracts longitudinally to lift the item above the conveyor at least as high as the height of the item.

10. The method of claim 7, further comprising injecting compressed air at another injection point by to the vacuum tube end for temporarily reducing vacuum to stop the materials being sucked up and to unclog said portion of the tubing.

* * * * *